United States Patent

[11] 3,550,825

| [72] | Inventor | Clay H. Collier<br>4418 West Congress St., Chicago, Ill. 60632 |
|---|---|---|
| [21] | Appl. No. | 744,102 |
| [22] | Filed | July 11, 1968 |
| [45] | Patented | Dec. 29, 1970 |

[54] SHOPPING CARRIER FOR AUTOMOBILE
7 Claims, 5 Drawing Figs.

[52] U.S. Cl. ................................................ 224/29, 224/42.1
[51] Int. Cl. .................................................. B60r 9/06
[50] Field of Search ............................................ 224/42.1E, 29, 42.1A, 42.1F, 42.1D, 42.1C, 42.1G, 42.45

[56] References Cited
UNITED STATES PATENTS
| 2,594,319 | 4/1952 | Law.............................. | 224/29 |
| 2,596,860 | 5/1952 | McCrory...................... | 224/42.1(E) |
| 3,058,636 | 10/1962 | Bilbeisi........................ | 224/42.1(E)X |
| 3,215,323 | 11/1965 | Bonitt........................... | 224/29 |
| 3,341,096 | 9/1967 | Stanley........................ | 224/42.1(E)X |

FOREIGN PATENTS
| 242,296 | 10/1962 | Australia ...................... | 224/42.1E |
| 1,008,873 | 2/1952 | France .......................... | 224/42.1E |
| 1,091,531 | 10/1954 | France .......................... | 224/42.1A |
| 1,241,253 | 8/1960 | France .......................... | 224/42.1E |
| 1,327,816 | 4/1963 | France .......................... | 224/42.1E |

Primary Examiner—Gerald M. Forlenza
Assistant Examiner—Robert J. Spar
Attorney—Johnson, Dienner, Emrich, Verbeck & Wagner ABSTRACT: A generally rectangular shopping carrier supported on the trunk lid of an automobile, and means releasably mounting the shopping carrier to the trunk lid.

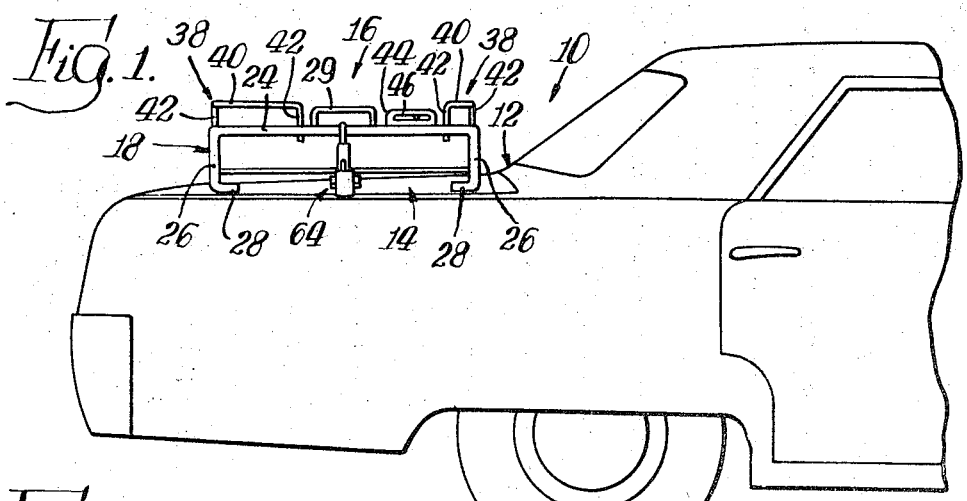
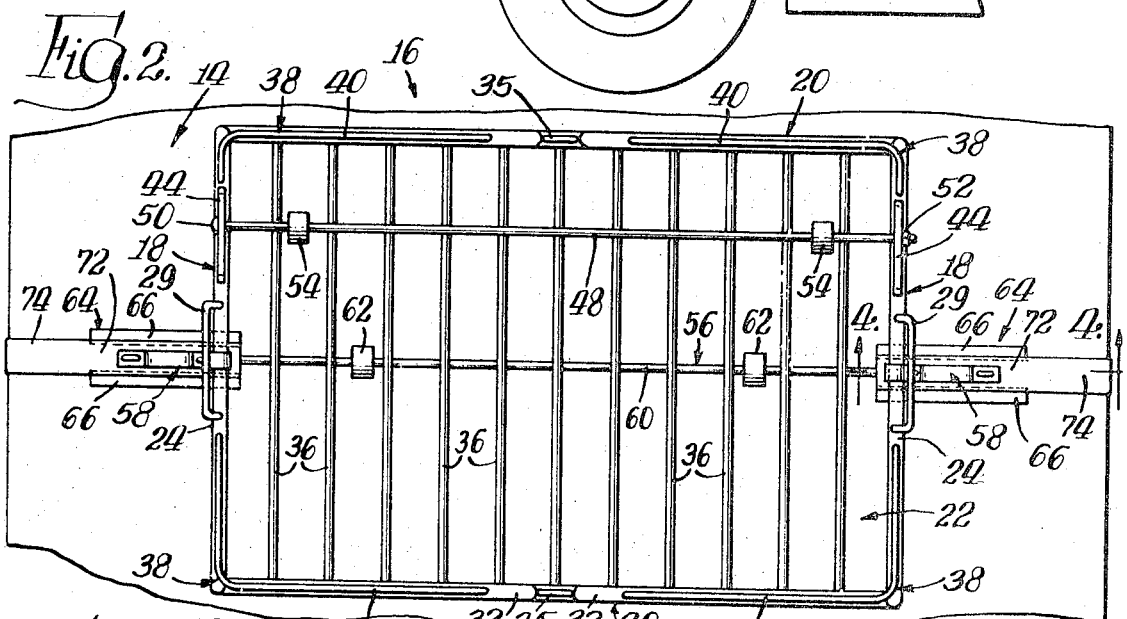
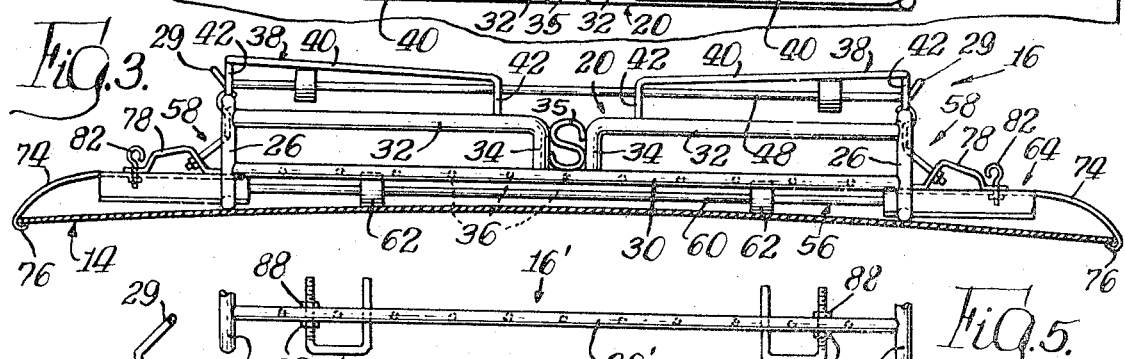
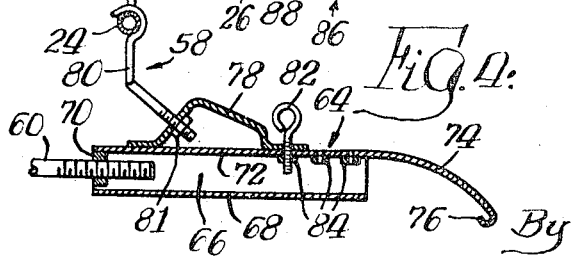

3,550,825

SHOPPING CARRIER FOR AUTOMOBILE

FIELD OF THE INVENTION

The present invention pertains to a shopping carrier adapted to be mounted on the trunk lid of an automobile for accommodating the transportation of various articles such as groceries and other packaged goods.

SUMMARY OF THE INVENTION

The shopping carrier of the present invention comprises a pair of transversely spaced upright side frame units, a pair of longitudinally spaced upright transverse frame units interconnecting the side frame units, and platform means secured in the frame units adjacent the lower portion thereof. The shopping carrier is supported on, and releasably mounted to, the trunk lid of an automobile.

In addition, auxiliary upright frame units are secured to the side and transverse frame units for increasing the vertical extent of the carrier; a divider extends transversely of the carrier and is adjustable to establish there within a separate compartment of variable size; and the means releasably mounting the carrier to the trunk lid is adjustable to accommodate trunk lids of different widths and contours. Also, the carrier may be provided with foot members which are vertically adjustable for leveling the carrier when used with a trunk lid that slopes in a longitudinal direction.

The various components of the carrier are essentially formed of tubular members and rods. As a result, the carrier is inexpensive to fabricate and assemble, and is relatively light in weight.

DESCRIPTION OF THE DRAWING

FIG. 1 is a side elevational view of the rear end of an automobile, and of the shopping carrier of the present invention mounted on the trunk lid of the automobile;

FIG. 2 is a plan view, on an enlarged scale, of the shopping carrier and a portion of the trunk lid of FIG. 1;

FIG. 3 is a rear elevational view of the shopping carrier of FIG. 2, and a cross sectional view of the trunk lid on which the carrier is mounted;

FIG. 4 is a sectional view of a portion of the carrier mounting means, taken substantially along the line 4—4 in FIG. 2 looking in the direction indicated by the arrows; and FIG. 5 is a partial rear elevational view of a modified embodiment of shopping carrier incorporating adjustable foot members.

DESCRIPTION OF THE PREFERRED EMBODIMENTS

Referring now to FIG. 1, there is indicated generally by the reference numeral 10 the rear end portion of a conventional automobile having a rear deck portion 12 with a trunk lid 14 which may be opened, as is well-known, to permit access to the interior of the automobile trunk. Supported on, and mounted to, the trunk lid 14 is the shopping carrier of the present invention which is indicated generally by the reference numeral 16.

As shown in FIGS. 1, 2 and 3, the shopping carrier 16 comprises a pair of transversely spaced upright side frame units 18, a pair of longitudinally spaced transverse upright frame units 20 interconnecting the side frame units 18, and platform means 22 adjacent the lower portion of the frame units 18 and 20.

Each of the side frame units 18, as shown for example in FIG. 1, includes a tubular side frame member 24 with an upper horizontal portion and depending end leg portions 26 supported by inturned foot portions 28 on the trunk lid 14. Suitable carrier handles 29 are joined to the side frame members 24 centrally thereof. Each of the transverse frame units 20, as shown for example in FIG. 3, includes a lower horizontal tubular frame member 30 secured at its ends to the leg portions 26 of the side frame members 24, and secondary tubular frame members 32 each having an upper horizontal portion secured to the adjacent side frame member 24 and a depending leg portion 34 secured to the lower frame member 30. A letter, or other indicia or insignia, may be disposed at 35 intermediate of the adjacent leg portions 34. The platform 22, as shown for example in FIG. 2, includes a plurality of transversely spaced rods 36 suitably secured at their ends in the lower frame members 30.

Extending about the corners of the shopping carrier 16, as shown in FIGS. 1, 2 and 3, are auxiliary upright frame units 38. Each of the frame units 38 includes a rod member 40 having an upper L-shape horizontal portion and depending end leg portions 42 secured to the adjacent side frame member 24 and the adjacent secondary frame member 32.

Secured to the side frame members 24 parallel thereto, as shown in FIGS. 1 and 2, are guide frames 44 which each have an elongated horizontal slot 46. A divider rod 48 extends transversely of the carrier 16 with the ends thereof extending through the guide frame slots 46. One end of the rod 48 is formed with a head 50, while the other end is threaded to receive a nut 52. The divider rod 48 is preferably provided with annular resilient cushion members 54.

As best illustrated in FIGS. 2 and 3, the carrier 16 is adapted to be secured to the trunk lid 14 by releasable mounting means comprising a transverse mounting assembly 56 and releasable clamp means 58. The mounting assembly 56 includes a transverse rod member 60 having annular resilient cushion members 62 resting on the trunk lid 14, and box like extension assemblies 64 threaded on the ends of the rod member 60.

Each extension assembly 64 (FIGS. 2 and 4) comprises sidewalls 66, a bottom wall 68, and end wall 70 with a threaded aperture, and a top wall 72 in the form of a strap member. The strap member 72 has downwardly bowed outer free end 74 with a curved-in lip 76 engaged with the adjacent side edge of the trunk lid 14.

Each of the clamp means 58 (FIG. 4) includes a band 78 secured at one end to the strap member 72, and a hook bolt or clamp member 80 carried by the band 78 and snap engaged with the horizontal portion of the adjacent side frame member 24. A nut 81 is threaded on the clamp member 80 and serves to permit adjustment of the latter relative to the band 78. A fastener or eyebolt 82 is disposed through apertures in the free end of the band 78 and in the strap member 72, and is threaded into one of a series of nuts 84 secured to the underside of the strap member 72.

In using the above described invention, the mounting assembly 56 is first placed transversely of the trunk lid 14, and the rod member 60 is rotated relative to the extension assemblies 64 until the strap member lips 76 are tightly engaged with the side edges of the trunk lid 14. By reason of this arrangement the carrier mounting means is adjustable to accommodate trunk lids of different widths and contours. Moreover, the transverse mounting assembly 56 does not interfere with the opening and closing of the trunk lid, and, therefore, may be retained permanently secured to the trunk lid. The cushion members 62 on the rod member 60 serve to prevent undesirable marring of the trunk lid as the mounting assembly 66 is installed or removed.

After the mounting assembly 56 has been installed, the shopping carrier 16 is positioned on the trunk lid 14, the clamp fasteners 82 are removed, and the clamp members 80 are snap engaged with the upper horizontal portions of the side frame members 24. Then, the apertures in the free ends of the bands 78 are each aligned with one of the apertures in each of the strap members 72 and the clamp fasteners 82 are threaded into the associated nuts 84. When the free ends of the bands 78 are secured by the fasteners 82 against the straps 72, the bands 78 maintain the clamp members 80 tight and the latter lock the carrier 16 to the trunk lid. The provision of a series of mounting nuts 84 in each extension assembly 64 allows adjustment of the bands 78 to compensate for changes made in the length of the mounting assembly 56 to accommodate different trunk lids.

The mounted carrier 16 may be used to transport various articles such as groceries and other packaged goods. The articles to be transported are supported on the platform rods 36 and are primarily retained within the confines of the carrier 16 by the upright side and transverse frame units 18 and 20. The auxiliary frame units 38 increase the vertical extent of the carrier 16 and serve as additional article retention means. The divider rod 48 may be adjusted within the guide frame slots 46 longitudinally of the carrier to establish at the forward end thereof a separate compartment of variable size. Small package goods, such as cartons of cola, may be inserted into the separate compartment, and thereby restrained against shifting movement within the carrier. The divider rod 48 may be releasably secured in any adjusted position by tightening the nut 52, and the cushion members 54 may be used to yieldably engage articles within the separate compartment for more positive positioning thereof. When use of the carrier 16 is not required, the clamp means 58 may be released and the carrier removed from the trunk lid without disturbing the mounting assembly 56.

In the modified embodiment of shopping carrier 16' shown in FIG. 5, the rearward lower tubular frame member 30', which extends between the leg portions 26 of the side frame members 24, is provided with U-shaped foot members 86 having bight portions that engage the trunk lid 14. The vertical leg portions of each foot member 86 extends through apertures formed in the frame member 30' and nuts 88 are provided on the threaded leg portion of each foot member 86 for releasably securing the members 86 to the frame member 30'. The foot members 86 are vertically adjustable for leveling the carrier when used with a trunk lid that slopes in a rearward longitudinal direction.

While there has been shown and described preferred embodiments of the present invention, it will be understood by those skilled in the art that various rearrangements and modifications may be made therein without departing from the spirit and scope of the invention.

I claim:

1. For use with an automobile having trunk lid, a shopping carrier assembly comprising a generally rectangular shopping carrier supported on the trunk lid, and means releasably mounting said shopping carrier to the trunk lid; said shopping carrier comprising a pair of transversely spaced upright side frame units with depending leg portions adapted to be supported on the trunk lid, a pair of longitudinally spaced upright transverse frame units interconnecting said side frame units, and platform means secured in at least two of said frame units adjacent the lower portion thereof; and said mounting means comprising only a single transverse mounting member, means carried at the ends of said mounting member and adapted to be engaged with the side edges of the trunk lid, and releasable clamp means carried at the ends of said mounting member and engaged with said side frame units to secure said shopping carrier to said mounting means when said shopping carrier is supported on the trunk lid by said depending leg portions.

2. The assembly of claim 1 including auxiliary upright frame units extending about the corners of said shopping carrier and secured to said side and transverse frame units for increasing the vertical extent of the latter.

3. In a shopping carrier assembly adapted for use with an automobile having a trunk lid: a generally rectangular shopping carrier supported on the trunk lid, and means releasably mounting said shopping carrier to the trunk lid; said shopping carrier comprising a pair of transversely spaced upright side frame units, a pair of longitudinally spaced upright transverse frame units, and platform means adjacent the lower portion of said frame units; said side frame units each including a tubular side frame member with an upper horizontal portion and depending end leg portions supported on the trunk lid; said transverse frame units each including a lower horizontal tubular frame member secured at its ends to said leg portions of said tubular side frame members, and secondary tubular frame members having an upper horizontal portion secured tubular frame members having an upper horizontal portion secured to said side frame members and a depending leg portion secured to said lower tubular frame member; and said platform means including a plurality of transversely spaced rods secured at their ends in said lower tubular frame members; the improvement which comprises auxiliary upright frame units extending about the corners of said shopping carrier, and each of said auxiliary frame units including a rod member having an upper L-shape horizontal portion and depending end leg portions respectively secured to one of said side frame members and one of said secondary frame members.

4. The assembly of claim 1 including guide frames secured to said side frame units parallel thereto and each having an elongated slot, and a divider extending transversely of said shopping carrier with the ends thereof extending through and being releasably secured along said slots whereby the position of said divider may be adjusted longitudinally of said carrier.

5. The assembly of claim 1 including foot member secured in said shopping carrier and engaged with the trunk lid, and said foot members being vertically adjustable for leveling said shopping carrier.

6. The assembly of claim 1 including U-shaped foot members secured in at least one of said transverse frame units and engaged with the trunk lid, and said foot members being vertically adjustable for leveling said shopping carrier.

7. In a shopping carrier assembly adapted for use with an automobile having a trunk lid: a generally rectangular shopping carrier supported on the trunk lid, and means releasably mounting said shopping carrier to the trunk lid; said shopping carrier comprising a pair of transversely spaced upright side frame units each including a tubular side frame member with an upper horizontal portion and depending end leg portions supported on the trunk lid, a pair of longitudinally spaced upright transverse frame units each including a lower horizontal tubular frame member secured at its ends to said leg portions of said tubular side frame members and secondary tubular frame members having an upper horizontal portion secured to said side frame members and a depending leg portion secured to said lower tubular frame member, and platform means including a plurality of transversely spaced rods secured at their ends in said lower tubular frame members; the improvement wherein said mounting means comprises a transverse mounting member, extension assemblies adjustably secured to the ends of said mounting member and engaged with the side edges of the trunk lid, and clamp members adjustably carried by said extension assemblies and engaged with said upper horizontal portions of said tubular side frame members to secure said shopping carrier to said mounting means.